(12) United States Patent
Maeda et al.

(10) Patent No.: US 8,033,470 B2
(45) Date of Patent: Oct. 11, 2011

(54) INFORMATION RECOGNITION PROCESSING APPARATUS AND INFORMATION RECOGNITION PROCESSING METHOD

(75) Inventors: Masaya Maeda, Kawasaki (JP); Bunpei Irie, Kawasaki (JP); Naotake Natori, Kunitachi (JP); Tomoyuki Hamamura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 232 days.

(21) Appl. No.: 12/550,920

(22) Filed: Aug. 31, 2009

(65) Prior Publication Data

US 2010/0065640 A1 Mar. 18, 2010

(30) Foreign Application Priority Data

Sep. 17, 2008 (JP) ................................ 2008-238331

(51) Int. Cl.
*G06K 21/00* (2006.01)
(52) U.S. Cl. .................... 235/462.06; 235/464
(58) Field of Classification Search ............. 235/462.06, 235/462.07, 462.15, 462.25, 454, 472
See application file for complete search history.

(56) References Cited

U.S. PATENT DOCUMENTS

| | | | | |
|---|---|---|---|---|
| 5,541,396 | A * | 7/1996 | Rentsch ........................ | 235/454 |
| 6,250,551 | B1 * | 6/2001 | He et al. .................... | 235/462.07 |
| 7,333,648 | B2 * | 2/2008 | Edic et al. ..................... | 382/131 |
| 7,558,437 | B2 * | 7/2009 | Misaka .......................... | 382/275 |
| 7,793,853 | B2 * | 9/2010 | Silverbrook et al. ......... | 235/494 |
| 2006/0209367 | A1 * | 9/2006 | Misaka .......................... | 358/500 |
| 2007/0013954 | A1 * | 1/2007 | Soeda et al. ................. | 358/3.26 |
| 2009/0196501 | A1 * | 8/2009 | Ma ................................ | 382/169 |

FOREIGN PATENT DOCUMENTS

| | | |
|---|---|---|
| EP | 0 805 411 A2 | 11/1997 |
| EP | 1 630 720 A1 | 3/2006 |
| JP | 11-238097 | 8/1999 |
| JP | 2005-266907 | 9/2005 |

OTHER PUBLICATIONS

European Search Report dated Dec. 17, 2010.

* cited by examiner

*Primary Examiner* — Daniel St. Cyr
(74) *Attorney, Agent, or Firm* — Pillsbury Winthrop Shaw Pittman, LLP

(57) ABSTRACT

An information recognition processing apparatus according to an embodiment of the invention includes a storage unit configured to store statistical information indicating results of identification information recognition processing in which an image of a first object to be read is read to acquire a plurality of first read images of different image brightness levels, and recognition of identification information included in the first read image of each brightness level is tried, an image reading unit configured to read an image of a second object to be read to acquire a plurality of second read images of different image brightness levels, and a recognition unit configured to preferentially execute a recognition process of identification information included in the second read image of a predetermined brightness level of the plurality of second read images of the different image brightness levels, based on the statistical information.

15 Claims, 13 Drawing Sheets

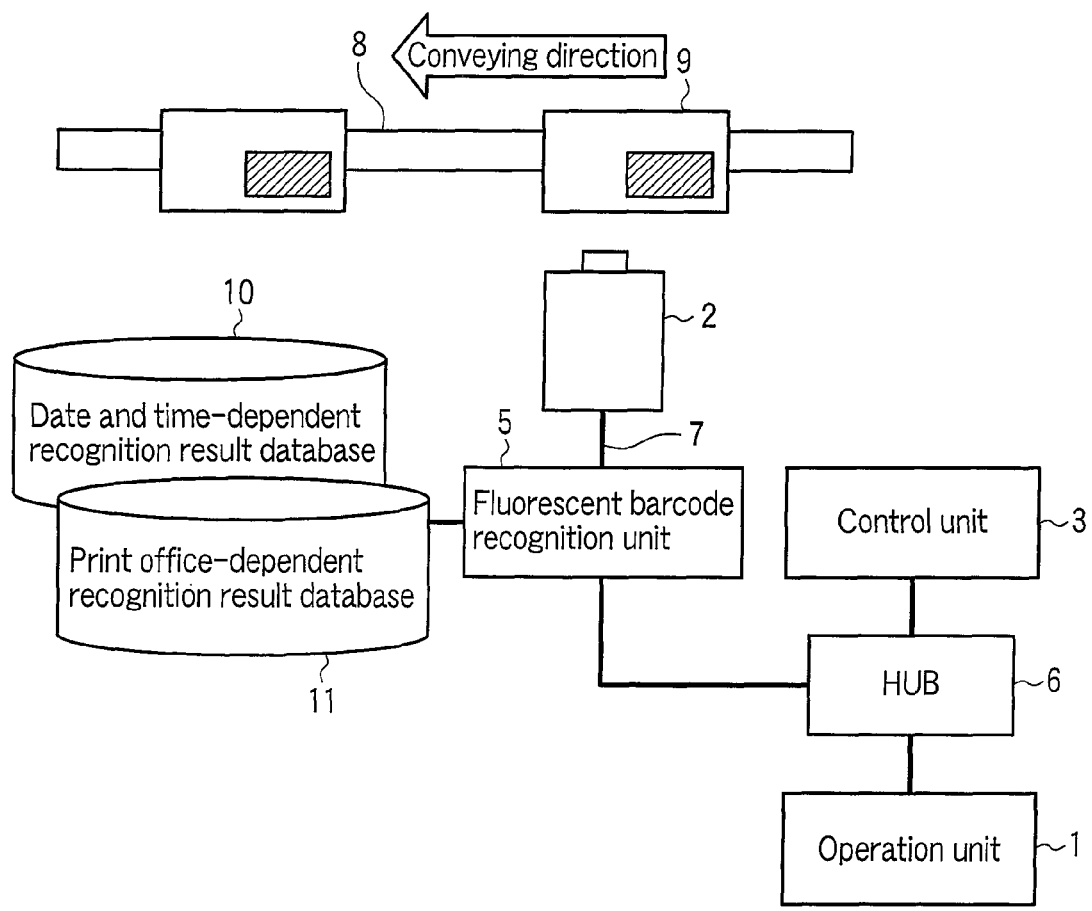
F I G. 1

Ideal fluorescent barcode image

Barcode image example on fluorescent-color letter

Letter background becomes luminous and bars are unclear

Barcode image example on black-background letter

Bar fluorescence is weakened due to letter background and bars are unclear

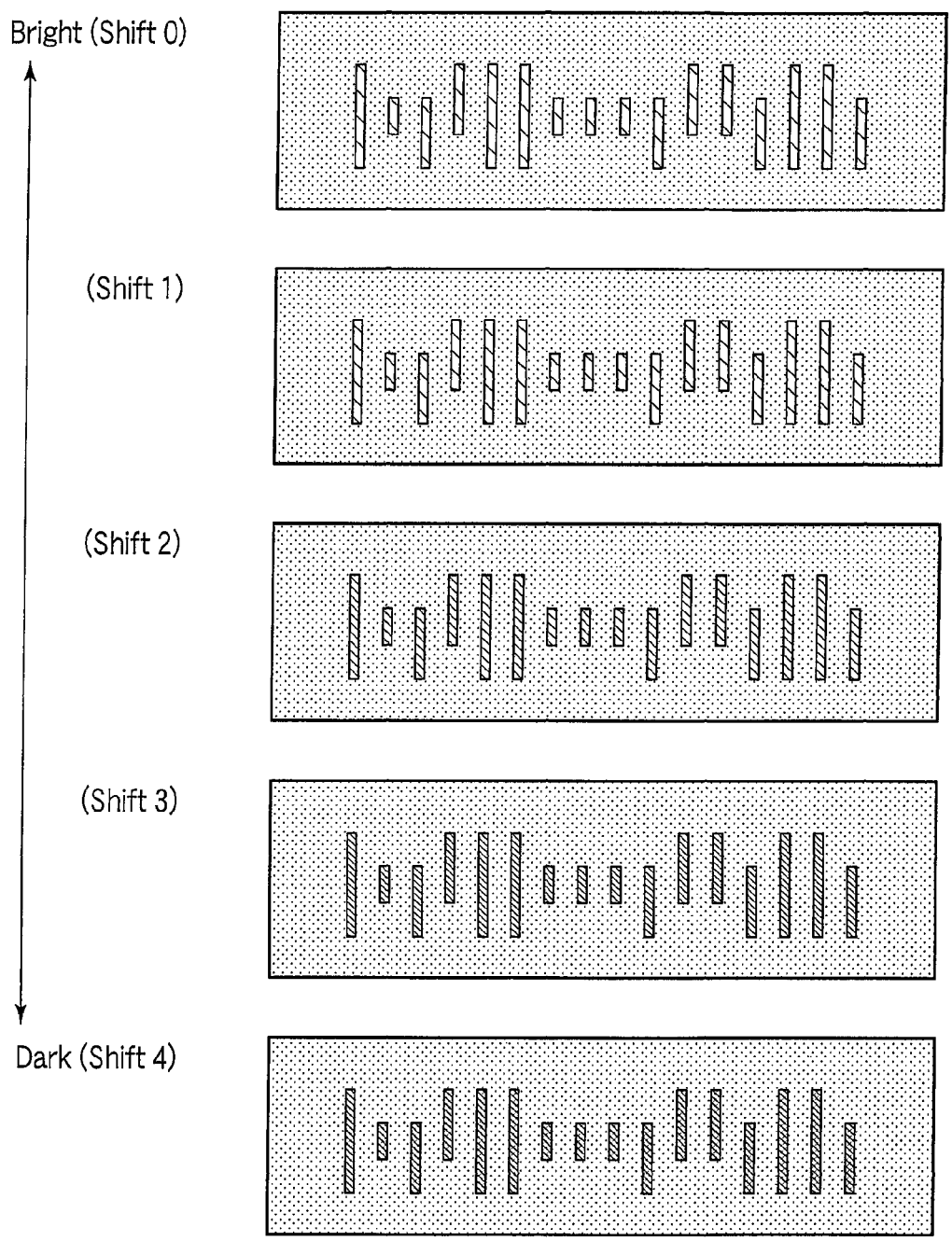
F I G. 5A

Date and time-dependent database

[Database name] : DAYTIME_DATABASE] ← Title line
processing date, processing time, total number of recognized letters, total number of unrecognized letters, average number of error corrections, average number of labels,
average upper bar-adding correction count, average lower bar-adding correction count, internal recognition process-dependent score addition table 0520, 10:00-11:00, 2852, 25, 0.2, 95, 0.03, 0.12, SCORE_TABLE05201000
0520, 11:00-12:00, 3872, 30, 0.2, 98, 0.08, 0.07, SCORE_TABLE05201100
..
0520, 20:00-21:00, 28965, 892, 8.5, 387, 2.35, 3.25, SCORE_TABLE05202000
..
0521, 10:00-11:00, 2925, 27, 0.2, 96, 0.05, 0.10, SCORE_TABLE05211000
..

← Recognition result data group

FIG. 11A

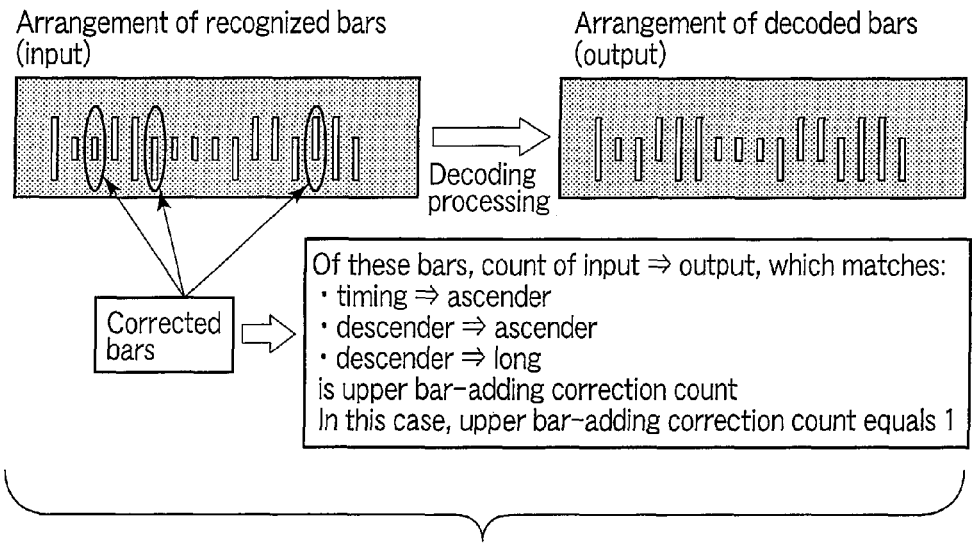
F I G. 12A
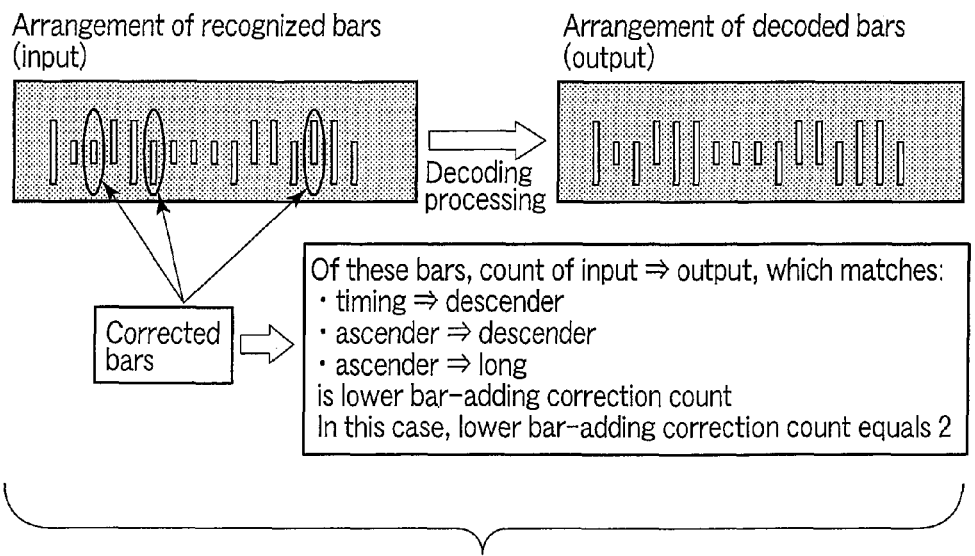
F I G. 12B

Internal process-dependent score addition table
(taking table of Tokyo office printer No. 1 as example)

【Database name : SCORE_TABLE_TOKYO1】 ← Title line
peak detection method number, noise removal method number, bar position
　detection method number
bar correction/classification method number, bar arrangement replace method number,
　accumulated score
0, 0, 0, 0, 0, 2550
0, 0, 0, 0, 1, 2700
..
2, 1, 0, 4, 0, 45250
..
3, 1, 2, 4, 1, 3200
..
⎯⎯ Recognition result data group

F I G. 14

INFORMATION RECOGNITION PROCESSING APPARATUS AND INFORMATION RECOGNITION PROCESSING METHOD

CROSS-REFERENCE TO RELATED APPLICATIONS

This application is based upon and claims the benefit of priority from prior Japanese Patent Application No. 2008-238331, filed Sep. 17, 2008, the entire contents of which are incorporated herein by reference.

BACKGROUND OF THE INVENTION

1. Field of the Invention

The invention relates to an information recognition processing apparatus and information recognition processing method, which recognize identification information such as a barcode printed on a postal item or the like.

2. Description of the Related Art

In the field of postal processing, a destination recognition apparatus which recognizes a destination recorded on each postal item is known. In order to recognize a destination recorded on a postal item within a short time, it is important to accurately find out a destination region on the postal item within a short time.

Jpn. Pat. Appln. KOKAI Publication No. 11-238097 discloses a technique in which a read postal item image, which is read in advance from a postal item, is compared with a registered postal item image, which is registered in advance, and when the read and registered postal item images meet a similar condition, a destination region is found out from the read postal item image with reference to destination region information registered in association with the registered postal item image.

The aforementioned destination recognition apparatus is configured by, for example, a plurality of computers, which execute distributed processes. However, a barcode recognition apparatus, which recognizes a barcode recorded on a postal item, is normally configured by a single computer. The barcode recognition apparatus recognizes a barcode by selecting an optimal recognition result from a plurality of barcode recognition results by a plurality of recognition processes, or by applying another recognition process when the barcode cannot be recognized by these plurality of recognition processes.

However, the barcode recognition apparatus often does not cope with a delay process. For this reason, a maximum processing period of barcode recognition tends to be strictly restricted. Hence, before execution of an effective recognition process, the maximum processing period has elapsed, and a timeout has occurred. In such situation, the recognition performance of the barcode recognition apparatus cannot be fully used, and may often lower.

For example, in a recognition process which reads an image from a postal item to acquire a plurality of images of different image brightness levels and uses these plurality of images, it is desirable to start the process from an image with a brightness level suited to the recognition process. However, the barcode recognition apparatus selects images in a predetermined order, and starts the recognition process. For this reason, before execution of the recognition process using the image of the brightness level suited to the recognition process, the maximum processing period has elapsed, and a timeout has occurred.

A specific printer often prints a barcode which is hardly recognized. Such barcode cannot be recognized by a normal recognition process, and another recognition process has to be applied. However, the barcode recognition apparatus is set to apply the other recognition process as needed after application of the normal recognition processes. For this reason, before execution of the other recognition process, the maximum processing period has elapsed, and a timeout has occurred.

BRIEF SUMMARY OF THE INVENTION

It is an object of the invention to provide an information recognition processing apparatus and information recognition processing method, which can fully use the recognition performance with a maximum processing period.

An information recognition processing apparatus according to an embodiment of the invention comprises a storage unit configured to store statistical information indicating results of identification information recognition processing in which an image of a first object to be read is read to acquire a plurality of first read images of different image brightness levels, and recognition of identification information included in the first read image of each brightness level is tried, an image reading unit configured to read an image of a second object to be read to acquire a plurality of second read images of different image brightness levels, and a recognition unit configured to preferentially execute a recognition process of identification information included in the second read image of a predetermined brightness level of the plurality of second read images of the different image brightness levels, based on the statistical information.

An information recognition processing method according to an embodiment of the invention comprises storing statistical information indicating results of identification information recognition processing in which an image of a first object to be read is read to acquire a plurality of first read images of different image brightness levels, recognition of identification information included in the first read image of a first brightness level, which is selected first based on a predetermined selection order, is tried, the recognition processing is completed when the recognition has succeeded, and recognition of identification information included in the first read image of a second brightness level, which is selected next, is tried when the recognition has failed, reading an image of a second object to be read to acquire a plurality of second read images of different image brightness levels, and preferentially executing a recognition process of identification information included in the second read image of a predetermined brightness level, based on the statistical information which includes a result of the identification information recognition processing indicating a success of recognition of identification information included in the first read image of the predetermined brightness level.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic block diagram showing the arrangement of a barcode processing apparatus (information recognition processing apparatus) according to an embodiment of the invention;

FIG. 5A is a view showing barcode images which are extracted from a black-background letter to have five brightness levels according to the embodiment;

FIG. 11A is a view showing date and time-dependent recognition result statistical data according to the embodiment;

FIG. 12A is a view for explaining an upper bar-adding correction count according to the embodiment;

FIG. 12B is a view for explaining a lower bar-adding correction count according to the embodiment;

FIG. 14 is a view showing an internal recognition process-dependent score addition table according to the embodiment.

DETAILED DESCRIPTION OF THE INVENTION

Figure 2:
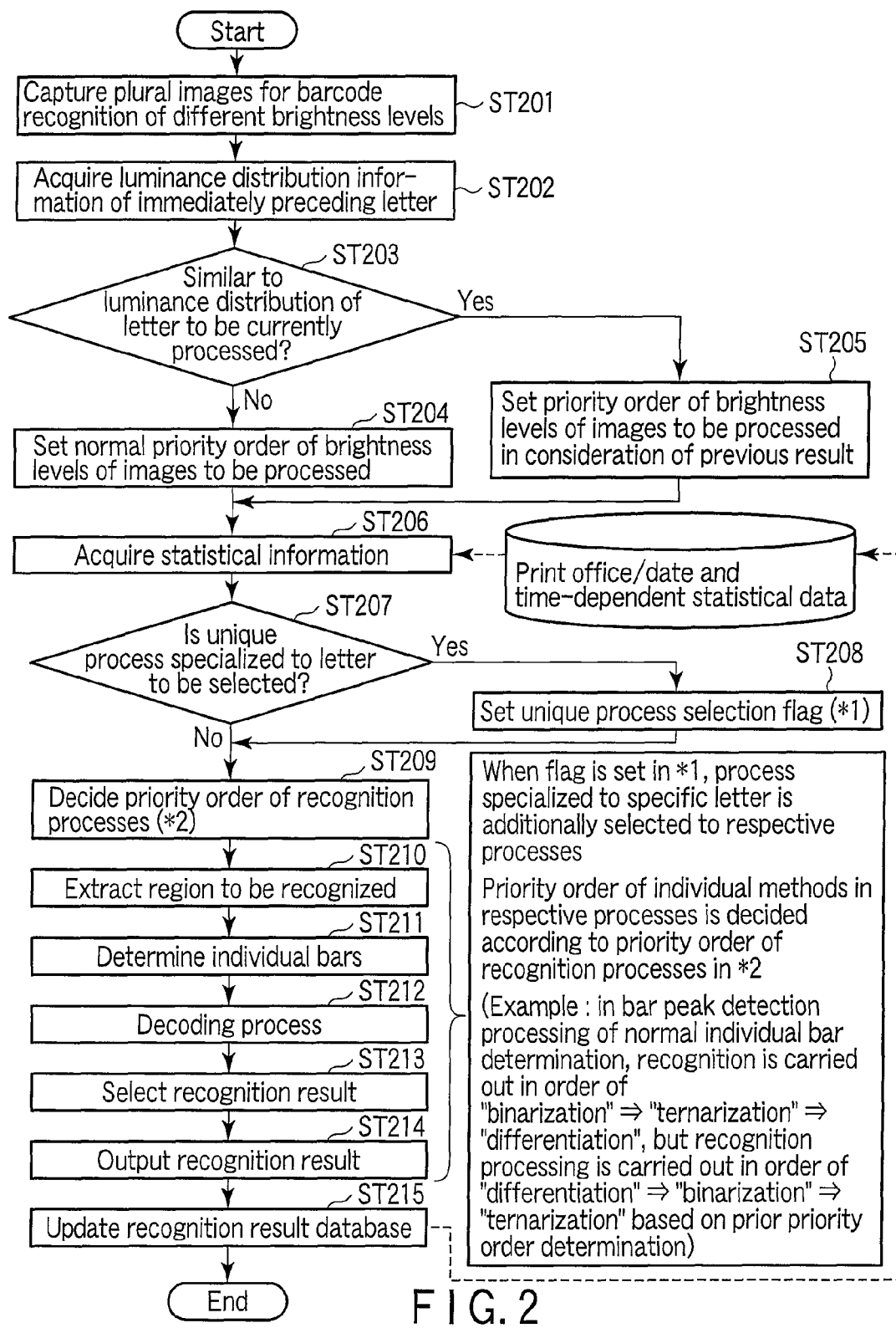
FIG. 2 is a flowchart showing an overview of barcode recognition processing according to the embodiment.

An embodiment of the present invention will be described hereinafter with reference to the drawings.

FIG. 1 is a schematic block diagram showing the arrangement of a barcode processing apparatus (information recognition processing apparatus) according to an embodiment of the invention. The barcode processing apparatus is applicable to, for example, a postal item sorter.

As shown in FIG. 1, the barcode processing apparatus includes an operation unit 1, fluorescent barcode scanner 2, control unit 3, fluorescent barcode recognition unit 5, hub 6, communication cable 7, conveyor belt 8, date and time-dependent recognition result database 10, and print office-dependent recognition result database 11.

The fluorescent barcode scanner 2 reads an image (fluorescent image) of a letter (object to be read) 9 such as a postal item conveyed on the conveyor belt 8 using invisible light. On the letter 9, a fluorescent barcode (identification information) is printed, and the fluorescent barcode scanner 2 reads this fluorescent barcode.

The fluorescent barcode recognition unit 5 is an image processing unit which processes a read image read by the fluorescent barcode scanner 2.

The operation unit 1 can be configured by, for example, a PC (personal computer). Likewise, the control unit 3 can be configured by, for example, a PC. Also, the fluorescent barcode recognition unit 5 can be configured by, for example, a PC.

The communication cable 7 connects the fluorescent barcode scanner 2 with the fluorescent barcode recognition unit 5, connects the fluorescent barcode recognition unit 5 with the date and time-dependent recognition result database 10 and print office-dependent recognition result database 11, and connects the hub 6 with the operation unit 1, control unit 3, and fluorescent barcode recognition unit 5.

The date and time-dependent recognition result database 10 stores statistical information indicating date and time-dependent barcode recognition processing results. The print office-dependent recognition result database 11 stores statistical information indicating print office-dependent barcode recognition processing results.

Note that when date and time-dependent recognition results are used, the date and time-dependent recognition result database 10 is indispensable, and when print office-dependent recognition results are used, the print office-dependent recognition result database 11 is indispensable. However, when date and time- and print office-dependent recognition results are not used, the date and time-dependent recognition result database 10 and print office-dependent recognition result database 11 are not indispensable components. Likewise, when operation information is not used, the operation unit 1 is not an indispensable component.

The fluorescent barcode scanner 2 reads an image for barcode recognition. The fluorescent barcode recognition unit 5 generates a plurality of read images of different image brightness levels, compares luminance information of each read image of an immediately preceding recognized letter (immediately preceding recognized postal item) with that of each read image to select a read image to be preferentially processed from the plurality of read images of different image brightness levels based on the luminance comparison results. The fluorescent barcode recognition unit 5 acquires statistical information from the statistical information databases that store barcode recognition processing results for respective print offices and respective dates and times, and judges, based on the statistical information, recognition processes to be applied and their order. The fluorescent barcode recognition unit 5 executes differential binarization labeling that labels clusters each having neighboring density differences greater than or equal to a predetermined value to extract a barcode region. The fluorescent barcode recognition unit 5 then determines individual bars, and decodes an arrangement of the determined bars as an input. When a plurality of barcode decoding results are obtained, the fluorescent barcode recognition unit 5 selects which of barcode decoding results is to be adopted, and outputs a barcode recognition result to the sorter side, log information, and the like. In place of differential binarization labeling, normal binarization labeling may be applied.

A practical sequence will be described below. Assume that the fluorescent barcode scanner 2 is calibrated in advance. That is, assume that the alignment and the like of the fluorescent barcode scanner 2 are complete.

Figure 3:
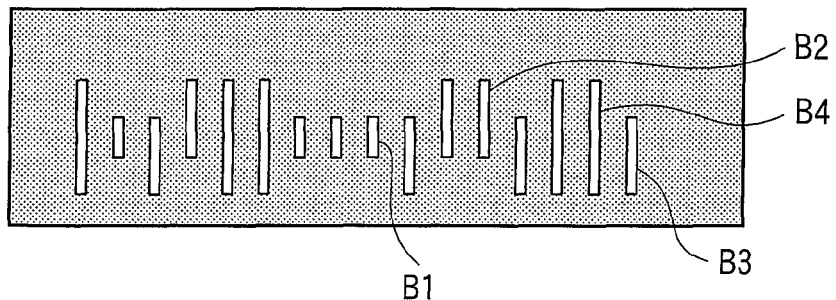
FIG. 3 is a view showing a barcode image according to the embodiment.

As shown in FIG. 3, a fluorescent barcode to be recognized is, for example, a 4-state barcode. The 4-state barcode includes a timing bar B1, ascender B2, descender B3, and long bar B4. The timing bar B1 is short, and the ascender B2 is long in only the upper direction. The descender B3 is long in only the lower direction, and the long bar B4 is long in both the upper and lower directions. Note that the fluorescent barcode to be recognized includes an error correction function based on Reed-Solomon decoding.

Figure 4A:
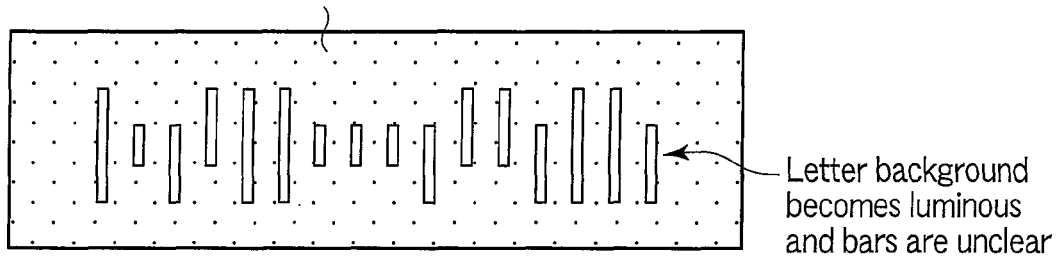
FIG. 4A is a view showing a barcode image read from a fluorescent-color letter according to the embodiment.
Figure 4B:
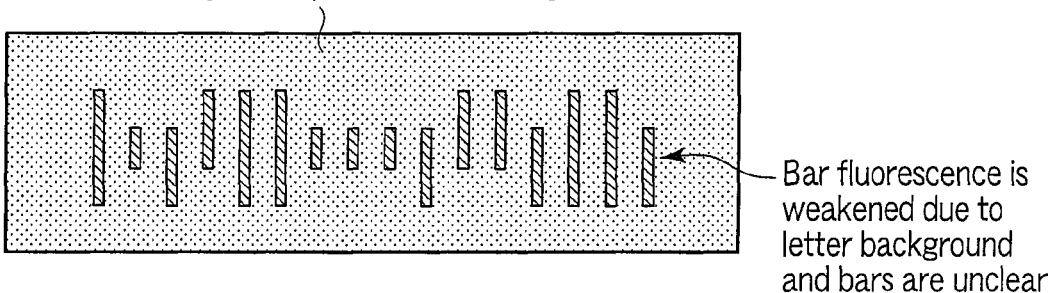
FIG. 4B is a view showing a barcode image read from a black-background letter according to the embodiment.

The fluorescent barcode scanner 2 reads an image of a letter (postal item), and acquires an image shown in FIG. 3. The image acquired by the fluorescent barcode scanner 2 becomes luminous in response to portions having fluorescent characteristics as its nature. Hence, in case of an envelope of a letter itself having a fluorescent color, an image on which a letter surface becomes luminous as well as bars is acquired, as shown in FIG. 4A. Conversely, in case of a black-background letter, i.e., a letter on which the luminous characteristics of the bars are weakened, an image on which bars nearly do not become luminous is acquired, as shown in FIG. 4B.

Figure 5B:
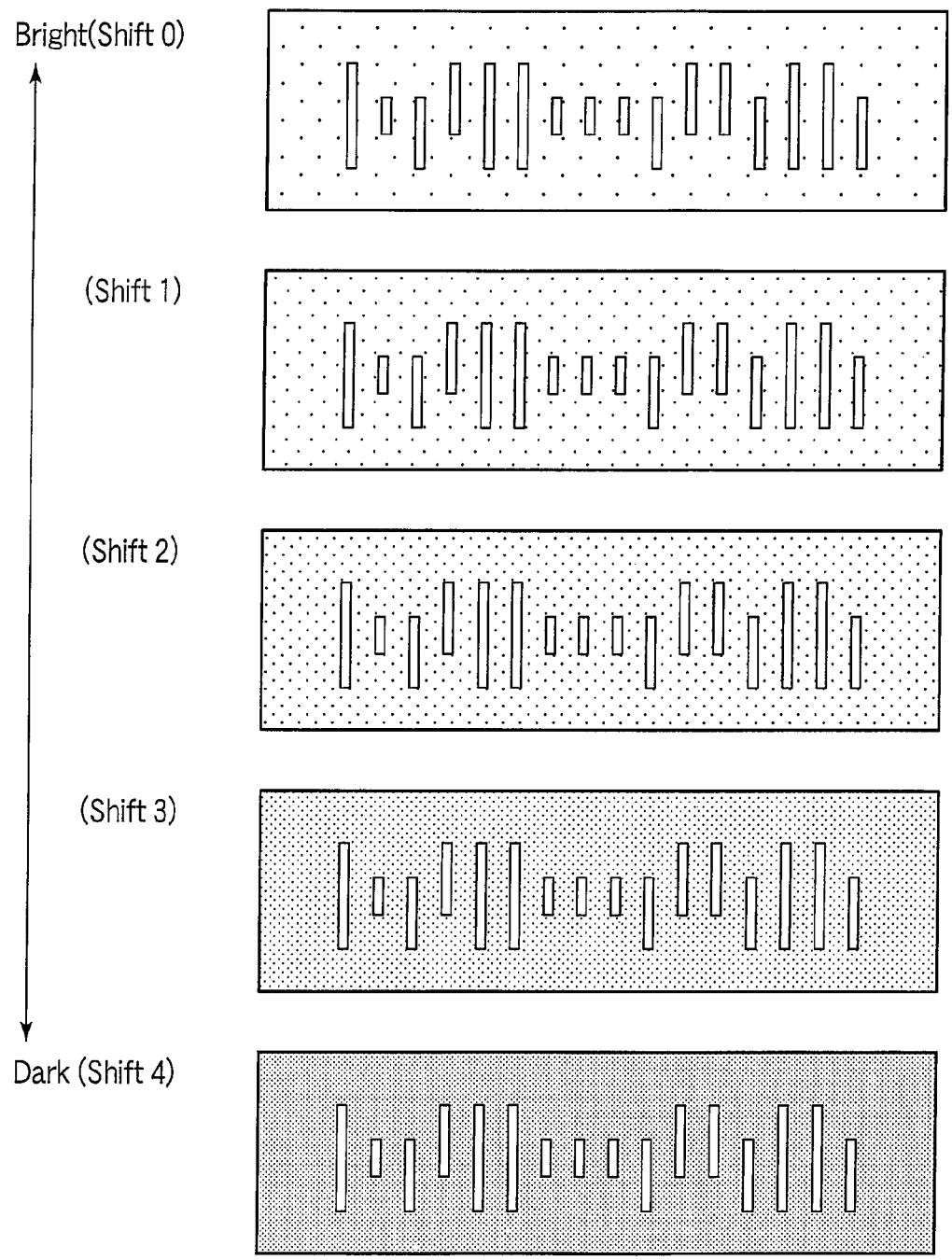
FIG. 5B is a view showing barcode images which are extracted from a fluorescent-color letter to have five brightness levels according to the embodiment.

Since a fluorescent barcode has the aforementioned characteristics, a plurality of read images of different image brightness levels are acquired, and a barcode is recognized using a read image of an optimal brightness level of these plurality of read images of different image brightness levels. For example, a 12-bit wide range scanner is applied to the fluorescent barcode scanner 2 to acquire a read image expressed by 12 bits, and images are extracted every 8 bits from the read image expressed by 12 bits. In this way, five read images of different image brightness levels can be acquired, as shown in FIGS. 5A and 5B. The five read images shown in FIGS. 5A and 5B are defined in turn from the uppermost image as a read image of a first brightness level, that of a second brightness level, that of a third brightness level, that of a fourth brightness level, and that of a fifth brightness level. Note that FIG. 5A shows an example of barcode images extracted to have five different brightness levels on a black-background letter, and FIG. 5B shows an example of barcode images extracted to have five different brightness levels on a fluorescent-color letter.

Note that the fluorescent barcode scanner 2 may acquire images of different brightness levels using different exposure periods.

Image brightness selection processing for selecting a read image of an optimal image brightness level from the plurality of read images of different image brightness levels will be described below.

The barcode processing apparatus reads images of letters conveyed in turn, and recognizes barcodes included in read images. In the date and time-dependent recognition result database 10 and print office-dependent recognition result database 11, pieces of statistical information indicating barcode recognition processing results are accumulated in turn. The barcode processing apparatus can use an immediately preceding barcode recognition processing result in the recognition processing of a barcode of a certain letter.

For example, the barcode processing apparatus reads an image of letter A to acquire a plurality of read images A of different image brightness levels, tries to recognize barcodes included in read images A of respective brightness levels based on a predetermined selection order, and stores statistical information indicating the results of identification information recognition processes. In this case, the statistical information includes, for example, a count value of the number of error corrections obtained at the time of recognition trial of a barcode included in read image A of the first brightness level, that of the number of error corrections obtained at the time of recognition trial of a barcode included in read image A of the second brightness level, that of the number of error corrections obtained at the time of recognition trial of a barcode included in read image A of the third brightness level, that of the number of error corrections obtained at the time of recognition trial of a barcode included in read image A of the fourth brightness level, and that of the number of error corrections obtained at the time of recognition trial of a barcode included in read image A of the fifth brightness level. Assume that the count value of the number of error corrections obtained at the time of recognition trial of a barcode included in read image A of the fifth brightness level is smallest.

Alternatively, the barcode processing apparatus reads an image of letter A to acquire a plurality of read images A of different image brightness levels. Then, the barcode processing apparatus tries to recognize a barcode included in read image A of the first brightness level which is selected first based on a predetermined selection order, and completes the recognition processing if recognition has succeeded. If recognition has failed, the barcode processing apparatus tries to recognize a barcode included in read image A of the second brightness level which is selected next, and completes the recognition processing if recognition has succeeded. If recognition has failed, the barcode processing apparatus tries to recognize a barcode included in read image A of the third brightness level which is selected next, and completes the recognition processing if recognition has succeeded. If recognition has failed, the barcode processing apparatus tries to recognize a barcode included in read image A of the fourth brightness level which is selected next, and completes the recognition processing if recognition has succeeded. If recognition has failed, the barcode processing apparatus tries to recognize a barcode included in read image A of the fifth brightness level which is selected next. For example, if recognition of the barcode included in read image A of the fifth brightness level has succeeded, the statistical information includes recognition success information indicating that recognition of the barcode included in read image A of the fifth brightness level has succeeded.

The fluorescent barcode scanner 2 reads an image of letter B, and provides read image B to the fluorescent barcode recognition unit 5. The fluorescent barcode recognition unit 5 generates read images B of the first, second, third, fourth, and fifth brightness levels. The fluorescent barcode recognition unit 5 acquires statistical information from the date and time-dependent recognition result database 10 or print office-dependent recognition result database 11. Furthermore, the fluorescent barcode recognition unit 5 compares read image A included in the statistical information with read image B provided from the fluorescent barcode scanner 2, and determines execution of priority processing of read image B of the fifth brightness level if the two images meet a predetermined similar condition.

With this priority processing, bulk letters can be efficiently recognized. For example, assume that it is decided in advance that recognition processes advance in the order of a read image of the first brightness level, that of the second brightness level, that of the third brightness level, that of the fourth brightness level, and that of the fifth brightness level. In addition, assume that the read image of the fifth brightness level is most suited to barcode recognition processing. That is, assume that a barcode cannot be recognized from the read images of the first, second, third, and fourth brightness levels, or their recognition rates are low. In such case, when the aforementioned priority processing is not applied, recognition processes for the read images of the first, second, third, fourth, and fifth brightness levels are applied in the recognition processing of all letters, resulting in very poor efficiency. Also, the recognition process for the read image of the fifth brightness level may not be executed because of a timeout and, as a result, a barcode may not be recognized.

By contrast, by applying the aforementioned priority processing, most of barcodes can be recognized by only the recognition process for the read image of the fifth brightness level without executing the recognition processes for the read images of the first, second, third, and fourth brightness levels (or by postponing them). That is, with the aforementioned priority processing, the recognition performance of the barcode processing apparatus can be effectively used within a maximum processing period. If a barcode cannot be recognized by the recognition process for the read image of the fifth brightness level, the read image of a brightness level corresponding to the next smallest number of error corrections is selected to continue the recognition process.

The fluorescent barcode recognition unit 5 updates the statistical information based on the recognition processing result of read image B. For example, if recognition of a barcode included in read image B of the fifth brightness level has failed, and that of a barcode included in read image B of the fourth brightness level has succeeded, the statistical information includes recognition success information indicating that recognition of a barcode included in read image B of the fourth brightness level has succeeded. Then, when the fluorescent barcode scanner 2 reads an image of letter C next, and provides read image C to the fluorescent barcode recognition unit 5, the fluorescent barcode recognition unit 5 compares read image B included in the recognition success information with read image C provided from the fluorescent barcode scanner 2, and determines execution of priority processing of read image C of the fourth brightness level if the two images meet the predetermined similar condition.

In this way, the barcode processing apparatus updates the statistical information in real time, and can efficiently execute the recognition processing based on the latest statistical information.

Figure 7:
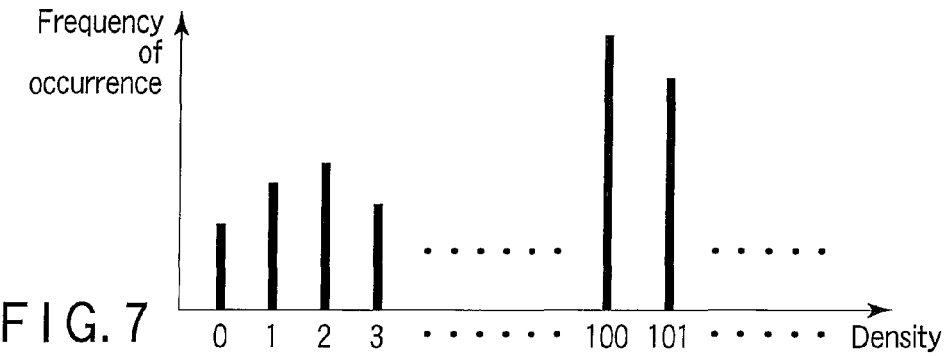
FIG. 7 is a graph showing density histogram information according to the embodiment.

A first practical example of the aforementioned image brightness selection processing will be described below. The aforementioned recognition success information includes, for example, density histogram information of read image A, as shown in FIG. 7. The density histogram information represents a distribution of frequencies of occurrence for respective densities of pixels which form read image A expressed by 12 bits. The fluorescent barcode recognition unit 5 also generates density histogram information of read image B. The fluorescent barcode recognition unit 5 compares the density histogram information of read image A with that of read image B and measures a similarity between read images A and B. If letters A and B are included in identical bulk letters, the density histogram information of read image A and that of read image B have similar graph distributions, and it is determined that read images A and B meet a similar condition.

As for shape detection, for example, square sums of differences between frequencies of occurrence of respective densities are used. Then, since similar histograms have small differences, it can be judged that read images A and B are similar images. If it is judged that read images A and B are similar images, the recognition success information of read image A is used in the recognition processing of read image B. For example, when the recognition success information of read image A includes all the recognition processing results of read images A of the first, second, third, fourth, and fifth brightness levels, the fluorescent barcode recognition unit 5 selects brightness levels in turn that from used in the recognition process with the smallest number of error corrections. When the recognition processing of read image A has failed, the statistical information includes recognition failure information of read image A, and the recognition failure information of read image A can also be used in the recognition processing of read image B. For example, when the recognition failure information of read image A includes information indicating that the recognition processes of read images A of the first, second, and third brightness levels have failed, read image B of the fourth or fifth brightness level is preferentially selected in the recognition processing of read image B, thus executing the recognition processing.

Figure 8A:
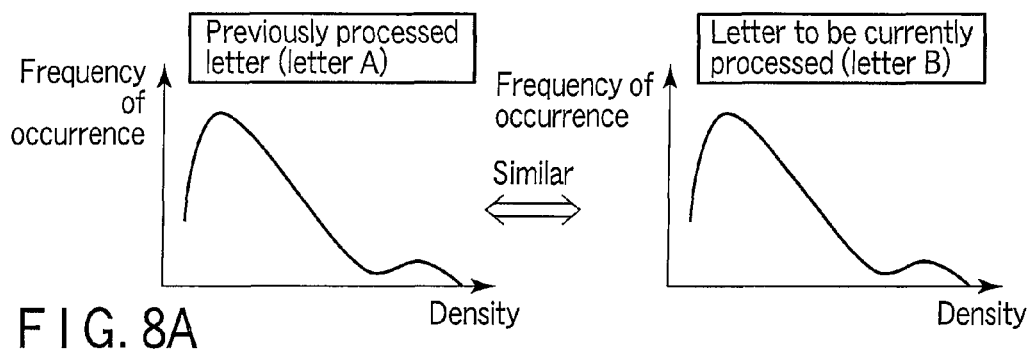
FIG. 8A shows two pieces of density histogram information which meet a similar condition according to the embodiment.
Figure 8B:
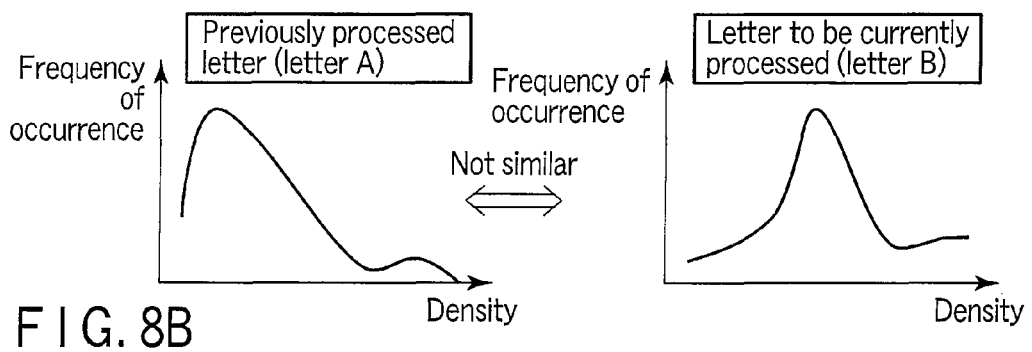
FIG. 8B shows two pieces of density histogram information which do not meet the similar condition according to the embodiment.

In the recognition processing of a barcode included in read image B, when read images A and B are not similar images, as shown in FIG. 8B, read images B of different image brightness levels are selected in turn based on a default selection order to recognize the barcode. Alternatively, in the recognition processing of a barcode included in read image B, even when read images A and B are not similar images, if read image X of letter X processed before letter A and read image B are similar images, the recognition processing of read image B can progress based on the recognition success or failure information of read image X.

Figure 9:
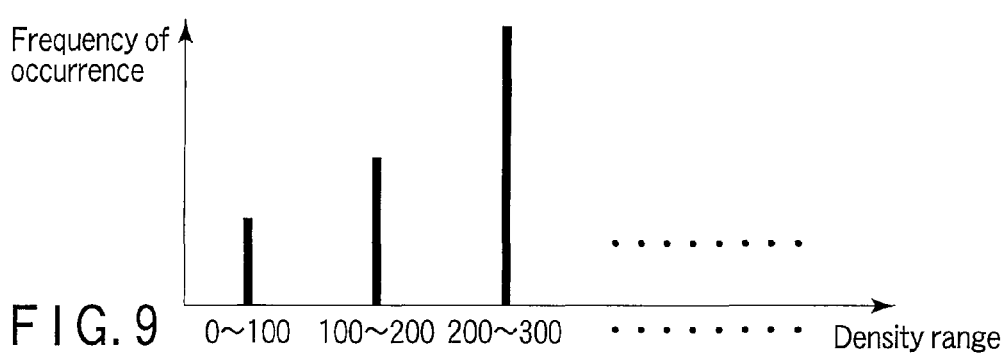
FIG. 9 is a graph showing another example of density histogram information according to the embodiment.

A second practical example of the aforementioned image brightness selection processing will be described below. In the second practical example, density histogram information shown in FIG. 9 is used in place of that shown in FIG. 7 described in the first practical example. The density histogram information shown in FIG. 9 includes histograms to have given ranges of densities as item axes in place of those having densities themselves as item axes. The density histogram information of read image A and that of read image B are generated, and square sums of differences for respective items are compared. Since the number of items for which the square sums are to be calculated is less than the first practical example, the comparison processing can be speeded up.

A third practical example of the aforementioned image brightness selection processing will be described below. In the third practical example, the density value as the mode value in read image A is compared with that in read image B to judge if read images A and B are similar images. One important point of image brightness selection is as to whether or not a letter itself becomes luminous, and the density value as the mode value depends on the luminous level of a letter itself having the largest area. When the difference between the density value as the mode value in read image A and that in read image B is less than or equal to a given value, read images A and B are determined as similar images. That is, when read images A and B have closer luminous amounts of the backgrounds of letters having the largest area, read images A and B are determined as similar images.

Figure 6:
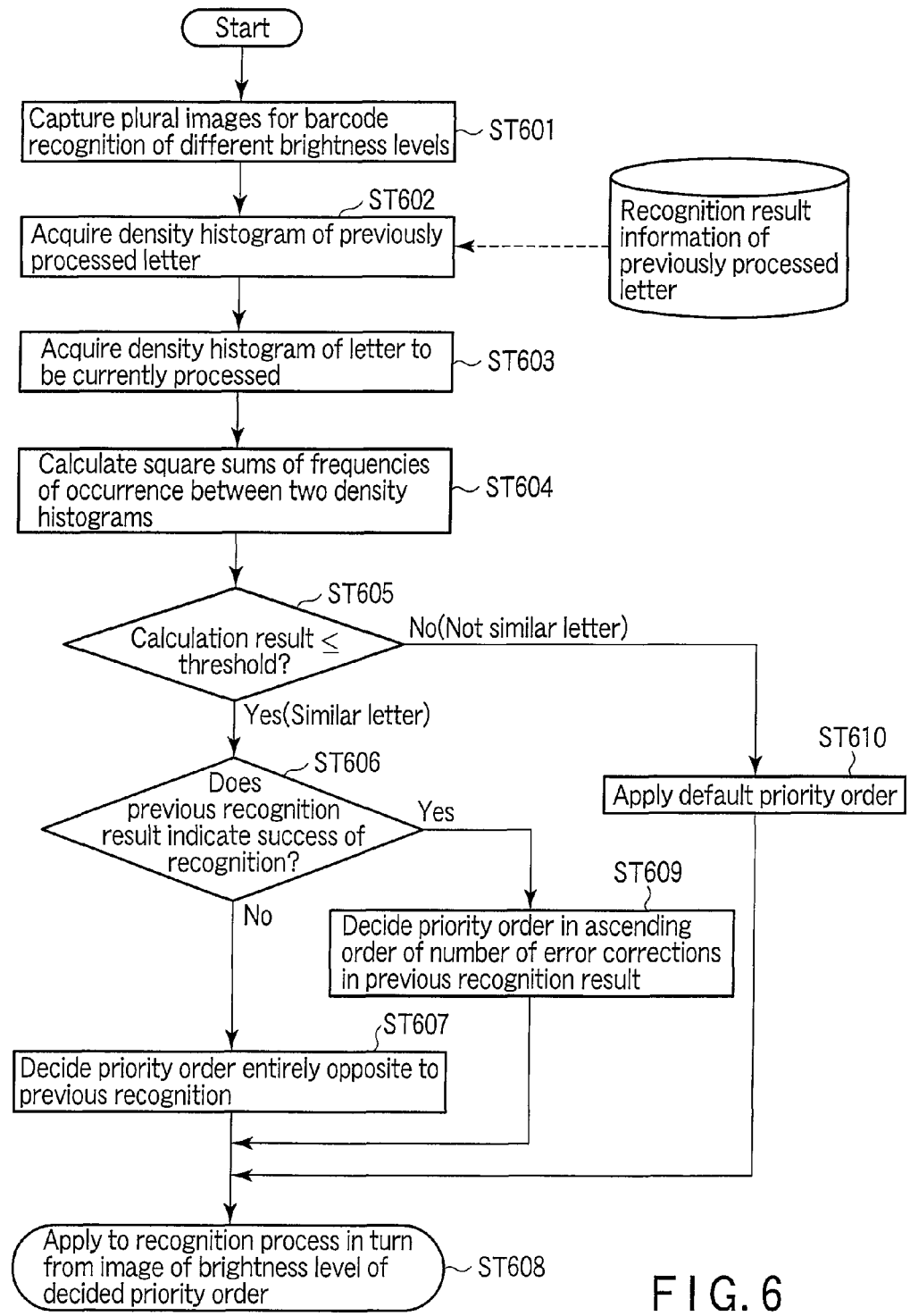
FIG. 6 is a flowchart showing an example of image brightness selection processing according to the embodiment.

An example of the image brightness selection processing will be described below with reference to the flowchart of FIG. 6.

The fluorescent barcode scanner 2 reads an image of, e.g., letter B (ST601), and the fluorescent barcode recognition unit 5 acquires a plurality of read images B of different image brightness levels. The fluorescent barcode recognition unit 5 acquires statistical information from the date and time-dependent recognition result database 10 and print office-dependent recognition result database 11. The statistical information includes information indicating the recognition processing result of letter A processed before letter B. The fluorescent barcode recognition unit 5 acquires density histogram information of letter B from read image B (ST602), acquires that of letter A from the statistical information (ST603), and compares the density histogram information of letter B with that of letter A. For example, the fluorescent barcode recognition unit 5 calculates square sums of differences between frequencies of occurrence of respective densities (ST604).

If the calculation result is less than or equal to a threshold (YES in ST605), the fluorescent barcode recognition unit 5 determines that letter B is similar to letter A. If a success of recognition of letter A is revealed from the statistical information, the fluorescent barcode recognition unit 5 decides a priority order of recognition processes based on the numbers of error corrections in the recognition processes of letter A (ST609). For example, assume that the number of error corrections in the recognition process using read image A of the fifth brightness level is smallest, and the number of error corrections increases in the order of read images A of the fourth, third, second, and first brightness levels. Then, the fluorescent barcode recognition unit 5 decides the order of read images of the fifth, fourth, third, second, and first brightness levels as the priority order of the recognition processes. The fluorescent barcode recognition unit 5 executes the recognition processes based on the decided priority order (ST608).

If a failure of recognition of letter A is revealed from the statistical information, the fluorescent barcode recognition unit 5 decides a priority order as an reverse order of the recognition processes of letter A (ST607). For example, assuming that the recognition processes are executed in the order of read images A of the fifth, fourth, and third brightness levels, and have failed, the fluorescent barcode recognition unit 5 decides, as a priority order of recognition processes, an order of read images B of the first, second, third, fourth, and fifth brightness levels. The fluorescent barcode recognition unit 5 executes the recognition processes based on the decided priority order (ST608).

If the calculation result is greater than the threshold (NO in ST605), the fluorescent barcode recognition unit 5 determines that letter B is not similar to letter A. In this case, the fluorescent barcode recognition unit 5 applies a default priority order (ST610). As a result, the fluorescent barcode recognition unit 5 executes the recognition processes in an order of read images B of the first, second, third, fourth, and fifth brightness levels (ST608).

Specific letter recognition processing using print office-dependent recognition result statistical data and date and time-dependent recognition result statistical data will be described below.

As described above, the barcode processing apparatus accumulates statistical data indicating recognition processing results in correspondence with the recognition processes. For example, the date and time-dependent recognition result database 10 accumulates date and time-dependent recognition result statistical data, and the print office-dependent recognition result database 11 accumulates print office-dependent recognition result statistical data.

Each print office-dependent recognition result statistical data includes statistical data which associates at least one of identification information of a print office (recording source specifying information used to specify a recording source that recorded a barcode) and identification information of a printer (also, recording source specifying information used to specify a recording source that recorded a barcode), and recognition results (including an effective recognition process) with each other. Each date and time-dependent recognition result statistical data includes statistical data which associates date and time data and recognition results (including effective recognition process) with each other.

An operator inputs identification information of a print office which applied print processing to a letter to be processed via the operation unit 1. Or the operator inputs identification information of a printer which applied print processing to a letter to be processed via the operation unit 1. Or the fluorescent barcode scanner 2 reads an image of a letter to be processed, and the fluorescent barcode recognition unit 5 recognizes identification information of a print office from the read image. Or the fluorescent barcode recognition unit 5 recognizes identification information of a printer from the read image.

The fluorescent barcode recognition unit 5 compares the identification information of a print office included in the print office-dependent recognition result statistical data with the input or recognized identification information of a print office. If the two pieces of identification information match, the fluorescent barcode recognition unit 5 applies the effective recognition process included in the print office-dependent recognition result statistical data to recognize a barcode included in the read image.

Or the fluorescent barcode recognition unit 5 compares the identification information of a printer included in the print office-dependent recognition result statistical data with the input or recognized identification information of a printer. If the two pieces of identification information match, the fluorescent barcode recognition unit 5 applies the effective recognition process included in the print office-dependent recognition result statistical data to recognize a barcode included in the read image.

Or the fluorescent barcode recognition unit 5 compares the date and time data included in the date and time-dependent recognition result statistical data with the current date and time. If the current date and time correspond to the date and time data, the fluorescent barcode recognition unit 5 applies the effective recognition process included in the date and time-dependent recognition result statistical data to recognize a barcode included in the read image.

In this manner, a specific recognition process can be applied to a letter processed by a specific print office or specific printer, or at a specific date and time. Note that the specific recognition process may be applied to a letter processed by a specific print office or specific printer, or at a specific date and time in addition to normal recognition processes, or only the specific recognition process may be applied.

For example, the above recognition processing is effective when ink scattering has occurred or print errors of upper or lower bars which become shorter than normal have occurred upon printing a barcode on a letter because of any misadjustment of a specific printer. That is, the specific recognition process that can cope with the characteristics of a defective barcode printed by the specific printer can be preferentially applied, and the recognition performance of the barcode processing apparatus can be fully used within a maximum processing period. In this case, the print office-dependent recognition result statistical data includes at least one of identification information of a print office and that of a printer which recorded the defective barcode, and also stores a predetermined recognition process effective for that of this defective barcode.

A first practical example of the aforementioned specific letter recognition processing will be described below.

Figure 11B:
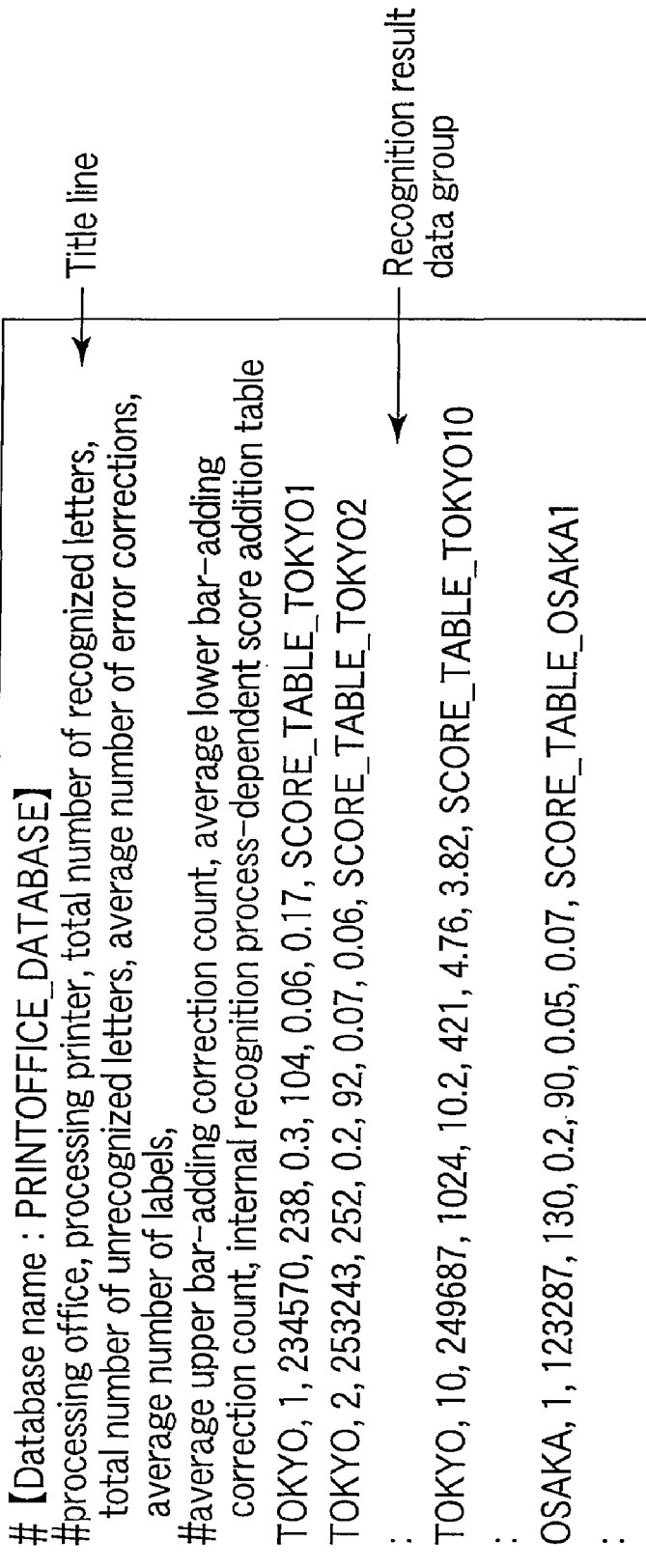
FIG. 11B is a view showing print office-dependent recognition result statistical data according to the embodiment.

FIG. 11A shows an example of the date and time-dependent recognition result statistical data, and FIG. 11B shows an example of the print office-dependent recognition result statistical data.

As shown in FIG. 11A, the date and time-dependent recognition result statistical data includes "total number of recognized letters", "total number of unrecognized letters", "average number of error corrections", "average number of labels", "average upper bar-adding correction count", "average lower bar-adding correction count", and "internal recognition process-dependent score addition table" which are associated with "processing date" and "processing time". As shown in FIG. 11B, the print office-dependent recognition result statistical data includes "total number of recognized letters", "total number of unrecognized letters", "average number of error corrections", "average number of labels", "average upper bar-adding correction count", "average lower bar-adding correction count", and "internal recognition process-dependent score addition table" which are associated with "processing office" and "processing printer".

Respective items are updated every time the recognition process is completed. In the date and time-dependent recognition result statistical data, "average" means an average of the total numbers of letters processed within a certain period. In the print office-dependent recognition result statistical data, "average" means an average of the total numbers of letters that have undergone print processing by a certain printer. The "number of error corrections" is an answer selected upon recognition of a certain letter, and indicates how many bars were corrected by comparing the arrangement of input bars with that of bars as a decode result. The "number of labels" indicates that calculated from the labeling results (black pixel coupling labels) after differential binarization. The "upper bar-adding correction count" indicates the number of corrections of bars to each of which a part of a bar is added on the upper side, as shown in FIG. 12A. Likewise, the "lower bar-adding correction count" indicates the number of corrections of bars to each of which a part of a bar is added on the lower side, as shown in FIG. 12B.

For example, assume that the average number of labels obtained in the recognition processes of letters printed by a specific printer exhibits an abnormal value (large value), and recognition errors occur frequently. Or assume that the average number of error corrections obtained in the recognition processes of letters printed by a specific printer exhibits a large value.

Initially, the operator inputs identification information of a print office that applied print processing to a letter to be processed via the operation unit 1. Or the operator inputs identification information of a printer that applied print processing to a letter to be processed via the operation unit 1. Or the fluorescent barcode scanner 2 reads an image of a letter to be processed, and the fluorescent barcode recognition unit 5 recognizes identification information (ID tag code) of a print office from the read image. Or the fluorescent barcode recognition unit 5 recognizes identification information (ID tag code) of a printer from the read image.

In the aforementioned case in which the average number of labels exhibits an abnormal value (large value) and recognition results are not satisfactory, it is supposed that an ink was scattered to form many small luminous labels, which adversely affect recognition. Thus, the fluorescent barcode recognition unit 5 adds a process which is not executed in normal recognition processing, i.e., a process that inhibits labels having sizes less than or equal to a given value from being used in recognition. Then, the recognition processes can efficiently progress for a letter that suffers a scattered ink print error without spending a wasteful recognition processing time. Since labels of ink scattered parts are inhibited from being used, the precision from region extraction until bar correction can be improved. Therefore, a barcode which cannot be normally recognized can be recognized.

Similar recognition processing can be executed using the date and time-dependent recognition result statistical data in place of the print office-dependent recognition result statistical data. For example, the recognition rates of identical time slots on different days are checked, and the recognition processing is changed according to the check result. This is because the processing order is normally decided in a given routine independently of dates in the sequence of postal item processing of the postal business (for example, arrival postal items from office A are processed in a time slot from 18:00 to 19:00 and those from office B are processed in a time slot from 19:00 to 20:00).

A second practical example of the aforementioned specific letter recognition processing will be described below.

Assume that in the print office-dependent recognition result statistical data, the average upper bar-adding correction count exhibits an abnormal value, and recognition errors occur frequently. Or assume that the average number of error corrections exhibits a large value.

In this case, it is supposed that upper bars are missing and are not correctly printed because of any misadjustment of a printer. Thus, the fluorescent barcode recognition unit 5 adds a process which is not executed in normal recognition, i.e., a process that gives a higher bar upper-side score at the time of bar classification processing. That is, a process for determining upper-side missing bars as upper bars is added. In this manner, a barcode (that including upper-side missing bars) which cannot be normally recognized can be recognized.

Figure 10:
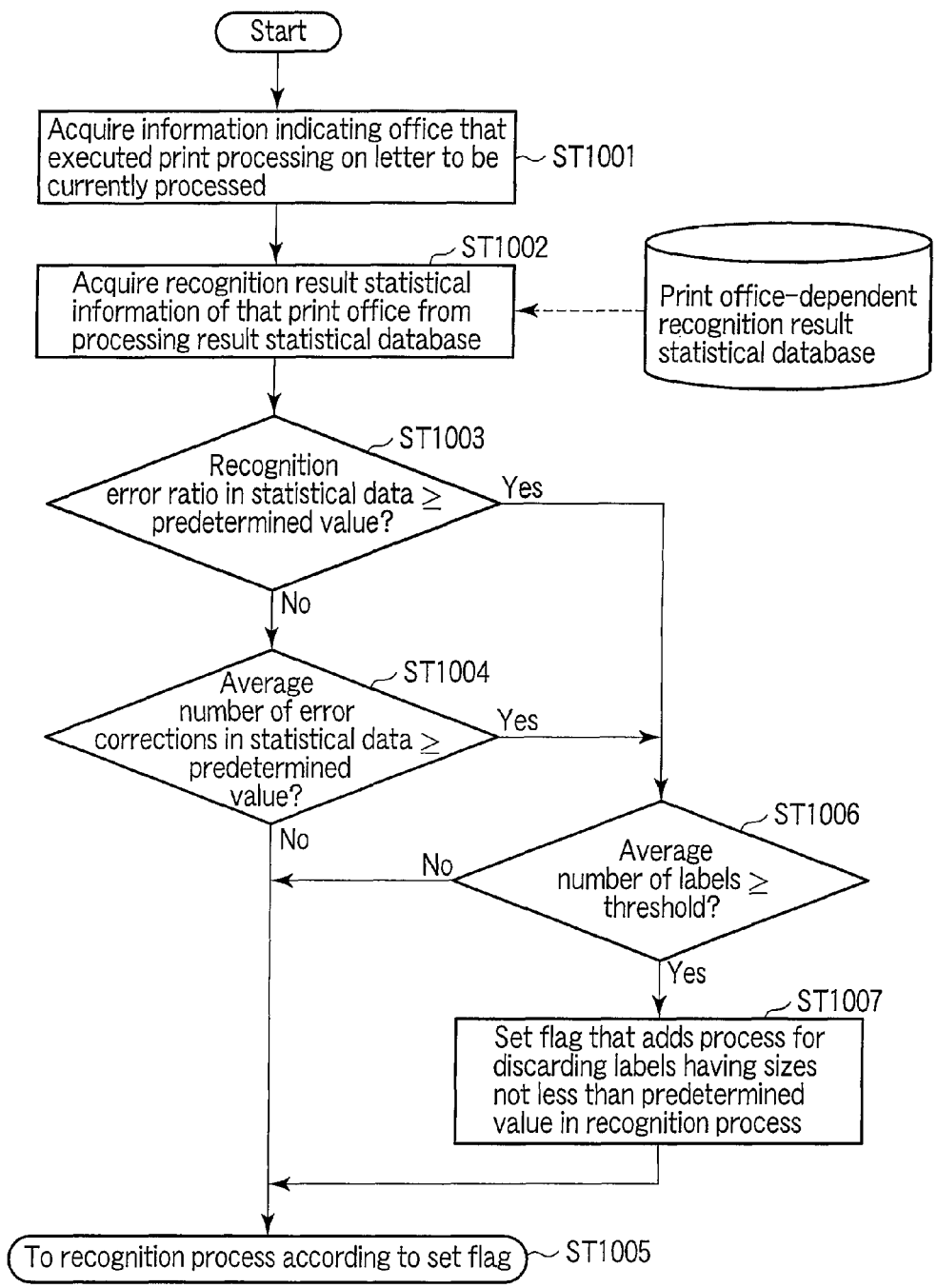
FIG. 10 is a flowchart showing recognition processing for a specific letter according to the embodiment.

An example of the specific letter recognition processing using the print office-dependent recognition result statistical data and date and time-dependent recognition result statistical data will be described below with reference to the flowchart of FIG. 10.

As described above, the fluorescent barcode recognition unit 5 acquires identification information of a print office which applied print processing to a letter to be processed (ST1001), and acquires statistical information indicating the recognition results of that print office from the print station-dependent recognition result database 11 (ST1002). If it is determined based on the statistical information that the recognition error ratio is less than a predetermined value (NO in ST1003) and that average number of error corrections is less than a predetermined value (NO in ST1004), the fluorescent barcode recognition unit 5 executes a combination of a plurality of recognition processes, which are designated in advance (ST1005).

If it is determined based on the statistical information that the recognition error ratio is greater than or equal to the predetermined value (YES in ST1003) or that the average number of error corrections is greater than or equal to the predetermined value (YES in ST1004), and if the average number of labels is greater than or equal to a threshold (ST1006), the fluorescent barcode recognition unit 5 adds a process for discarding labels having sizes greater than or equal to a predetermined value (ST1007), and executes a combination of a plurality of recognition processes together with the added process (ST1005).

Figure 13:
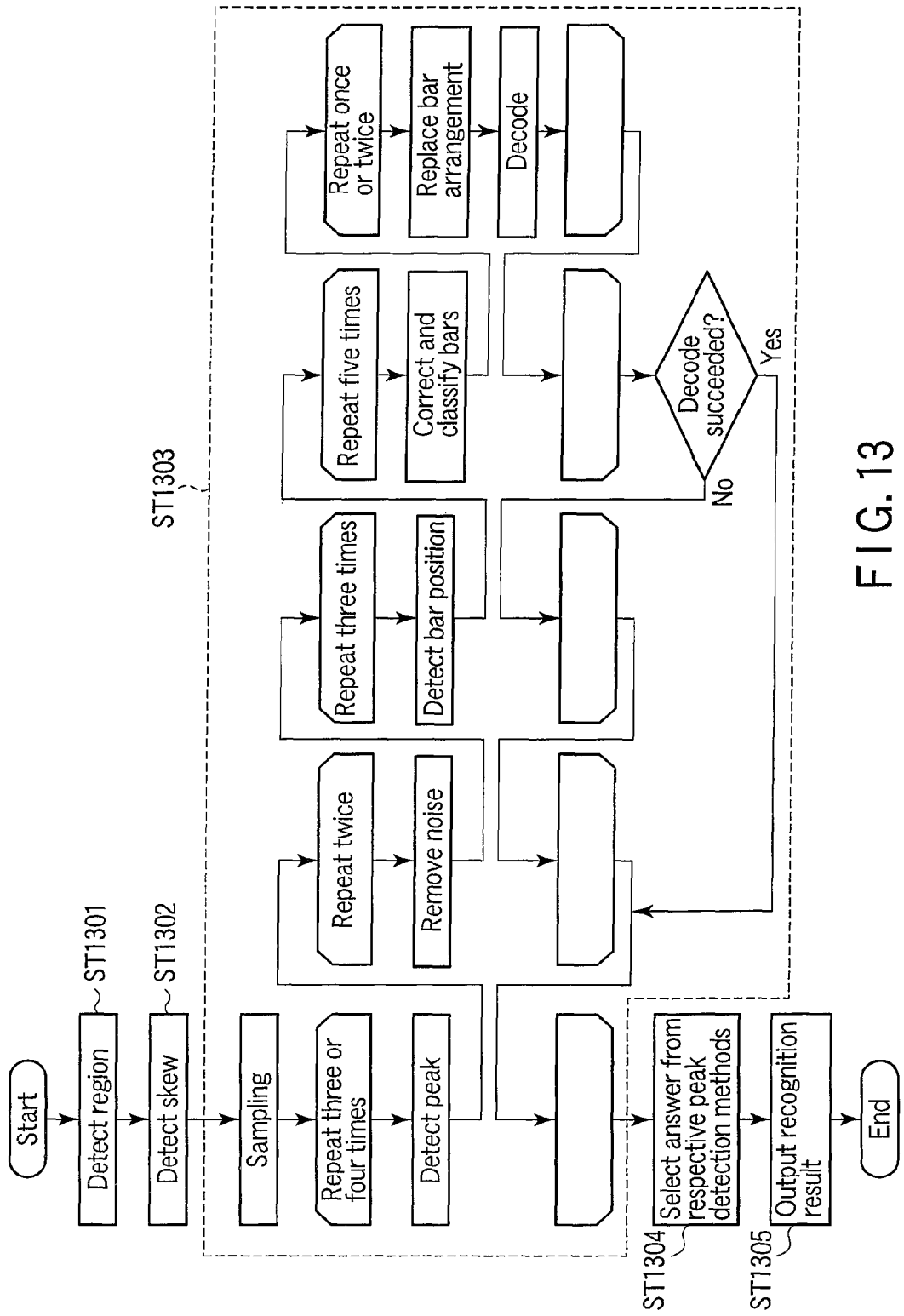
FIG. 13 is a flowchart showing barcode recognition processing according to the embodiment.

Effective recognition processing using the print office-dependent recognition result statistical data and date and time-dependent recognition result statistical data will be described below. Normally, the barcode processing apparatus recognizes a barcode by combining a plurality of processes in an order designated in advance, as shown in FIG. 13. Hence, the barcode processing apparatus preferentially executes some of the plurality of processes using the print office-dependent recognition result statistical data and date and time-dependent recognition result statistical data, thus improving the recognition processing efficiency.

For example, priority processing using the print office-dependent recognition result statistical data will be explained. As has already been described above, the operator inputs in advance identification information of a print office which applied print processing to a letter to be processed via the operation unit 1. Or the operator inputs in advance identification information of a printer which applied print processing to a letter to be processed via the operation unit 1. Or the fluorescent barcode scanner 2 reads an image of a letter to be processed, and the fluorescent barcode recognition unit 5 recognizes identification information of a print office from the read image. Or the fluorescent barcode recognition unit 5 recognizes identification information of a printer from the read image.

FIG. 14 shows an example of the internal recognition process-dependent score addition table shown in FIG. 11B. The internal recognition process-dependent score addition table indicates that the highest score is recorded for combined processes with the smallest number of error corrections of a plurality of processes tried for barcode recognition. More specifically, 100 points are recorded for a recognition process combination that detected an arrangement of bars with the number of error corrections equals 0, 50 points are recorded for a recognition process combination that detected an arrangement of bars with the number of error corrections equals 4, and −50 points are recorded for a recognition error. By sorting combined processes in descending order of score and assigning priority levels to the sorted combined processes, the effective combined processes can be ranked.

For example, an effective process combination is uniquely decided since bulk mail articles from a specific corporation make up the majority, or an old printer has a unique tendency (e.g., bars are thickened at the time of barcode printing). For this reason, the aforementioned processes effectively function. However, only the presence of the printer characteristics or bulk mail characteristics for each office is important, the aforementioned reason is not required, and an optimal process combination is selected based only on the recognition results. That is, since priority is decided based on an absolute reference, i.e., the number of error corrections at the time of decoding, information about original letters and printed states need not be provided.

An example of normal recognition processing will be described below with reference to FIG. 13. Initially, a barcode region is extracted (ST1301). That is, a part where labels are regularly arranged at a given pitch is extracted as a barcode region. A skew angle of the barcode is then detected from the arrangement of labels on the barcode region (ST1302). Individual bars are then determined. That is, bars are classified into four types based on their label lengths and positions, the arrangement of bars is used as input information, and the input information is decoded to acquire address information (ST1303). If many decoding results are obtained, an appropriate decoding result is adopted (ST1304). In general, the decoding result is normally selected with reference to the numbers of non-detections and the numbers of error corrections. After the appropriate decoding result is obtained, the recognition result is output to the sorter side, log information, and the like (ST1305).

Finally, the print office-dependent recognition result statistical data and date and time-dependent recognition result statistical data are updated based on the recognition result. Date and time information can be acquired from information possessed by a PC as needed. Information indicating a print office (printer) that printed a barcode can be obtained from the ID tag code. Note that information indicating a print office may be input from the operation unit 1.

FIG. 2 is a flowchart for explaining the overall sequence of the aforementioned recognition processing. As shown in FIG. 2, the fluorescent barcode scanner 2 reads an image of, e.g., letter B, and the fluorescent barcode recognition unit 5 acquires a plurality of read images B of different image brightness levels (ST201). The fluorescent barcode recognition unit 5 acquires statistical information from the date and time-dependent recognition result database 10 and print station-dependent recognition result database 11 (ST202). The statistical information includes information indicating the recognition processing results of letter A processed before letter B, and the recognition processing results of letter A include luminance distribution information of letter A.

The fluorescent barcode recognition unit 5 acquires luminance distribution information of letter B from read images B, and acquires that of letter A from the statistical information. The fluorescent barcode recognition unit 5 compares the luminance distribution information of letter B with that of letter A to determine a similarity between letters B and A (ST203). If letters B and A are not similar to each other (NO in ST203), the fluorescent barcode recognition unit 5 applies a default priority order (ST204). If letters B and A are similar to each other (YES in ST203), the fluorescent barcode recognition unit 5 decides a priority order of recognition processes based on the numbers of error corrections in the recognition processes of letter A (ST205).

Furthermore, the fluorescent barcode recognition unit 5 determines based on the statistical information if a unique process specialized to letter B is to be selected (ST207). If the recognition process specialized to letter B is selected (YES in ST207), the fluorescent barcode recognition unit 5 sets a unique process selection flag (ST208). If the recognition process specialized to letter B is not selected (NO in ST207), the fluorescent barcode recognition unit 5 decides priority levels of the recognition processes (ST209).

After that, a region to be recognized is extracted (ST210). Individual bars are determined (ST211). A barcode is decoded (ST212). A recognition result is selected (ST213), and is output (ST214). The statistical information is updated (ST215).

This embodiment will be summarized below.

(1) A barcode processing apparatus, which recognizes a barcode by combining a plurality of processes, records statistical information of barcode recognition results so far in a database in advance, finds a combination of processes, which are determined to be effective for a current barcode to be recognized using that statistical information, and executes priority processing in turn from that process.

(1-1) The statistical information includes barcode recognition results classified in correspondence with a print office and printer, which printed the barcode.

(1-2) As a method of specifying a print office and printer, the operator inputs identification information of the print office and printer of a letter which is scheduled to be processed. The statistical information is updated and used using this input identification information.

(1-3) As another method of specifying a print office and printer, a scanner reads an ID tag code. The statistical information is updated and used using the read result of the ID tag code.

(1-4) The statistical information includes barcode recognition results classified based on time slots in which barcodes were printed.

(2) A barcode processing apparatus, which recognizes a barcode by combining a plurality of processes, reads an image, acquires a plurality of read images of different image brightness levels, and recognizes a barcode using these plurality of read images of the different image brightness levels. A brightness level, which is included in a predetermined read image and is suited to recognizing a barcode, is stored. Upon recognizing a barcode from a read image having a form similar to that of the predetermined read image, a read image of the stored optimal brightness level is preferentially applied to recognition processing.

(2-1) An image is captured a plurality of times by changing an exposure time of a scanner to acquire a plurality of read images of different image brightness levels.

(2-2) A certain range is extracted from an image acquired by a wide range scanner to acquire a plurality of read images of different image brightness levels.

(2-3) A similarity between image forms is determined based on histogram information of luminance values.

(3) A barcode processing apparatus, which recognizes a barcode by combining a plurality of processes, selects a process which is not executed in normal recognition and is specialized to a cause of a recognition error, as needed, when it is determined based on identification information of a print office and printer, which printed a barcode on a letter, that a problem has occurred in recognition of a barcode which was printed by the print office and printer of this identification information.

(3-1) As a method of specifying a print office and printer, the operator inputs identification information of the print office and printer of a letter which is scheduled to be processed.

(3-2) As another method of specifying a print office and printer, a scanner reads an ID tag code.

(3-3) When the number of occurrences of barcode recognition errors exceeds a prescribed value for the predetermined number of letters, it is determined that a problem has occurred in barcode recognition. Or when the number of error correction times for bars exceeds a prescribed value for the predetermined number of letters, it is determined that a problem has occurred in barcode recognition.

(3-4) Causes of a problem that has occurred in barcode recognition include ink scattering and the like.

(3-5) Causes of a problem that has occurred in barcode recognition include upper-side missing bars or lower-side missing bars.

As described above, for example, an effect of improving the recognition rate can be obtained by preventing a limit period from elapsing without executing a recognition process which has a latter execution order and is effective for a given letter. An effect of improving the recognition rate can be obtained by preventing a limit period from elapsing without selecting an image of an appropriate brightness level in recognition processing for respectively recognizing barcodes from a plurality of images of different brightness levels, and selecting a best result. In addition, an effect of improving the recognition rate can also be obtained by applying a process which is normally not executed using statistical information even when a specific printer causes print errors and the like because of misadjustments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recognition processing apparatus comprising:
a storage unit configured to store statistical information indicating results of identification information recognition processing in which an image of a first object to be read is read to acquire a plurality of first read images of different image brightness levels, and recognition of identification information included in the first read image of each brightness level is tried;
an image reading unit configured to read an image of a second object to be read to acquire a plurality of second read images of different image brightness levels; and
a recognition unit configured to preferentially execute a recognition process of identification information included in the second read image of a predetermined brightness level of the plurality of second read images of the different image brightness levels, based on the statistical information.

2. The apparatus according to claim 1, wherein the storage unit is configured to store the statistical information indicating recognition processing result of a barcode recorded on the first object to be read, and
the recognition unit is configured to recognize a barcode recorded on the second object to be read based on the statistical information.

3. The apparatus according to claim 1, wherein the recognition unit is configured to preferentially execute, when the statistical information indicates that the number of error corrections obtained at the time of a recognition trial of identification information included in the first read image of a predetermined brightness level is smallest, a recognition process of identification information included in the second read image of the predetermined brightness level.

4. The apparatus according to claim 1, wherein the recognition unit is configured to update the statistical information based on recognition processing results of identification information included in the second read images.

5. The apparatus according to claim 1, wherein the storage unit is configured to store form-dependent statistical information which associates the statistical information and first image format information of the first object to be read,
the image reading unit is configured to read the image of the second object to be read to acquire second image format information of the second object to be read, and
the recognition unit is configured to preferentially execute, when the first image format information and the second image format information meet a similar condition, a recognition process of identification information included in the second read image of the predetermined brightness level based on the statistical information.

6. The apparatus according to claim 1, wherein the storage unit is configured to store form-dependent statistical information which associates the statistical information and first image format information represented by histograms of luminance values,
the image reading unit is configured to read the image of the second object to be read to acquire second image format information represented by histograms of luminance values, and
the recognition unit is configured to preferentially execute, when the first image format information and the second image format information meet the similar condition, a recognition process of identification information included in the second read image of the predetermined brightness level based on the statistical information.

7. The apparatus according to claim 1, wherein the image reading unit is configured to read the second object to be read using a plurality of different exposure times to acquire a plurality of second read images of different image brightness levels.

8. The apparatus according to claim 1, wherein the image reading unit is configured to read the second object to be read to acquire a second read image indicated by a first bit range, and to extract a plurality of types of second bit ranges from the first bit ranges to acquire a plurality of second read images of different image brightness levels indicated by the plurality of types of second bit ranges.

9. An information recognition processing apparatus comprising:
- a storage unit configured to store statistical information indicating results of identification information recognition processing, which recognizes identification information included in read images based on a plurality of processes;
- an image reading unit configured to read an image to be read to acquire read images; and
- a recognition unit configured to select effective processes based on the statistical information and to recognize the identification information included in the read image based on the effective processes.

10. The apparatus according to claim 9, wherein the storage unit is configured to store the statistical information indicating results of barcode recognition processing that recognizes a barcode included in the read image based on the plurality of processes, and
the recognition unit is configured to select effective processes based on the statistical information and to recognize a barcode included in the read image based on the effective processes.

11. The apparatus according to claim 9, wherein the recognition unit is configured to select, based on the statistical information, combined processes in which the number of error corrections is smallest, and to recognize identification information included in the read image based on the selected combined processes.

12. The apparatus according to claim 9, wherein the storage unit is configured to store recording condition-dependent statistical information which associates the statistical information and recording source specifying information used to specify a recording source which recorded a barcode on an object to be read with each other, and
the recognition unit is configured to acquire recording source specifying information used to specify a recording source which recorded the barcode on the object to be read, to select effective processes based on the recording condition-dependent statistical information under the condition that the recording source specifying information included in the recording condition-dependent statistical information matches the acquired recording source specifying information, and to recognize a barcode included in the read image based on the effective processes.

13. The apparatus according to claim 9, wherein the storage unit is configured to store barcode recognition processing time slot-dependent statistical information, and
the recognition unit is configured to select statistical information corresponding to a current time from the barcode recognition processing time slot-dependent statistical information, to select effective processes based on the selected statistical information, and to recognize a barcode included in the read image based on the effective processes.

14. An information recognition processing apparatus comprising:
- a storage unit configured to store recording source specifying information used to specify a recording source which recorded identification information;
- an acquisition unit configured to acquire recording source specifying information used to specify a recording source which recorded identification information on an object to be recognized;
- an image reading unit configured to read an image of the object to be recognized to acquire a read image; and
- a recognition unit configured to recognize identification information included in the read image by applying a predetermined recognition process when the stored recording source specifying information matches the acquired recording source specifying information.

15. An information recognition processing method comprising:
- storing statistical information indicating results of identification information recognition processing in which an image of a first object to be read is read to acquire a plurality of first read images of different image brightness levels, recognition of identification information included in the first read image of a first brightness level, which is selected first based on a predetermined selection order, is tried, the recognition processing is completed when the recognition has succeeded, and recognition of identification information included in the first read image of a second brightness level, which is selected next, is tried when the recognition has failed;
- reading an image of a second object to be read to acquire a plurality of second read images of different image brightness levels; and
- preferentially executing a recognition process of identification information included in the second read image of a predetermined brightness level, based on the statistical information which includes a result of the identification information recognition processing indicating a success of recognition of identification information included in the first read image of the predetermined brightness level.

* * * * *